US009438447B2

(12) United States Patent
Basso et al.

(10) Patent No.: US 9,438,447 B2
(45) Date of Patent: *Sep. 6, 2016

(54) FLOW DISTRIBUTION ALGORITHM FOR AGGREGATED LINKS IN AN ETHERNET SWITCH

(71) Applicant: International Business Machines Corporation, Armonk, NY (US)

(72) Inventors: Claude Basso, Nice (FR); Natarajan Vaidhyanathan, Carrboro, NC (US); Colin B. Verrilli, Apex, NC (US); Bruce M. Walk, Rochester, MN (US); Daniel Wind, Drap (FR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 580 days.

This patent is subject to a terminal disclaimer.

(21) Appl. No.: 13/718,479

(22) Filed: Dec. 18, 2012

(65) Prior Publication Data

US 2014/0173128 A1    Jun. 19, 2014

(51) Int. Cl.
*G06F 15/16*     (2006.01)
*G06F 15/173*    (2006.01)
*H04L 12/54*     (2013.01)
*G06F 17/30*     (2006.01)
*H04L 12/743*    (2013.01)
*H04L 12/709*    (2013.01)

(52) U.S. Cl.
CPC ..... *H04L 12/5689* (2013.01); *G06F 17/30067* (2013.01); *H04L 45/245* (2013.01); *H04L 45/7453* (2013.01); *Y02B 60/33* (2013.01)

(58) Field of Classification Search
CPC ... H04L 12/569; H04L 47/10; H04L 45/245; H04L 45/7453; H04L 12/56; H04L 9/0643; H04L 9/0687; G06F 17/30097
USPC ...................................................... 709/238
See application file for complete search history.

(56) References Cited

U.S. PATENT DOCUMENTS

| 6,934,293 | B1 | 8/2005 | DeJager et al. |
| 7,315,865 | B1* | 1/2008 | Jernigan, IV ................. 707/754 |
| 7,454,405 | B2* | 11/2008 | Shiozawa et al. |
| 7,545,930 | B1* | 6/2009 | Shields ......................... 380/44 |
| 8,014,278 | B1* | 9/2011 | Subramanian et al. ...... 370/229 |
| 8,015,290 | B2 | 9/2011 | Talayco |
| 8,089,965 | B2* | 1/2012 | Mitsumori .................... 370/390 |
| 8,185,459 | B2 | 5/2012 | Wall et al. |
| 2005/0086363 | A1 | 4/2005 | Ji |
| 2005/0283489 | A1* | 12/2005 | Shiozawa et al. ............ 707/100 |
| 2008/0298236 | A1 | 12/2008 | Ervin et al. |
| 2010/0182920 | A1 | 7/2010 | Matsuoka |
| 2012/0026871 | A1 | 2/2012 | Hu et al. |
| 2012/0026878 | A1 | 2/2012 | Scaglione |
| 2012/0033665 | A1 | 2/2012 | Da Silva et al. |
| 2012/0136999 | A1 | 5/2012 | Roitshtein et al. |
| 2012/0163164 | A1 | 6/2012 | Terry et al. |
| 2012/0170575 | A1 | 7/2012 | Mehra |

* cited by examiner

*Primary Examiner* — Kristie Shingles
(74) *Attorney, Agent, or Firm* — Patterson + Sheridan, LLP

(57) ABSTRACT

Link aggregation is a practice that uses multiple Ethernet links between two end points in order to obtain higher bandwidth and resiliency than possible with a single link. A flow distribution technique is provided to distribute traffic between the two end points equally across all links in the group and achieve greater efficiency. The flow distribution technique generates and sub-divides a hash value based on received packet flow. The divided portions of the hash value are used in a hierarchical fashion to select a link to use for this packet.

14 Claims, 4 Drawing Sheets

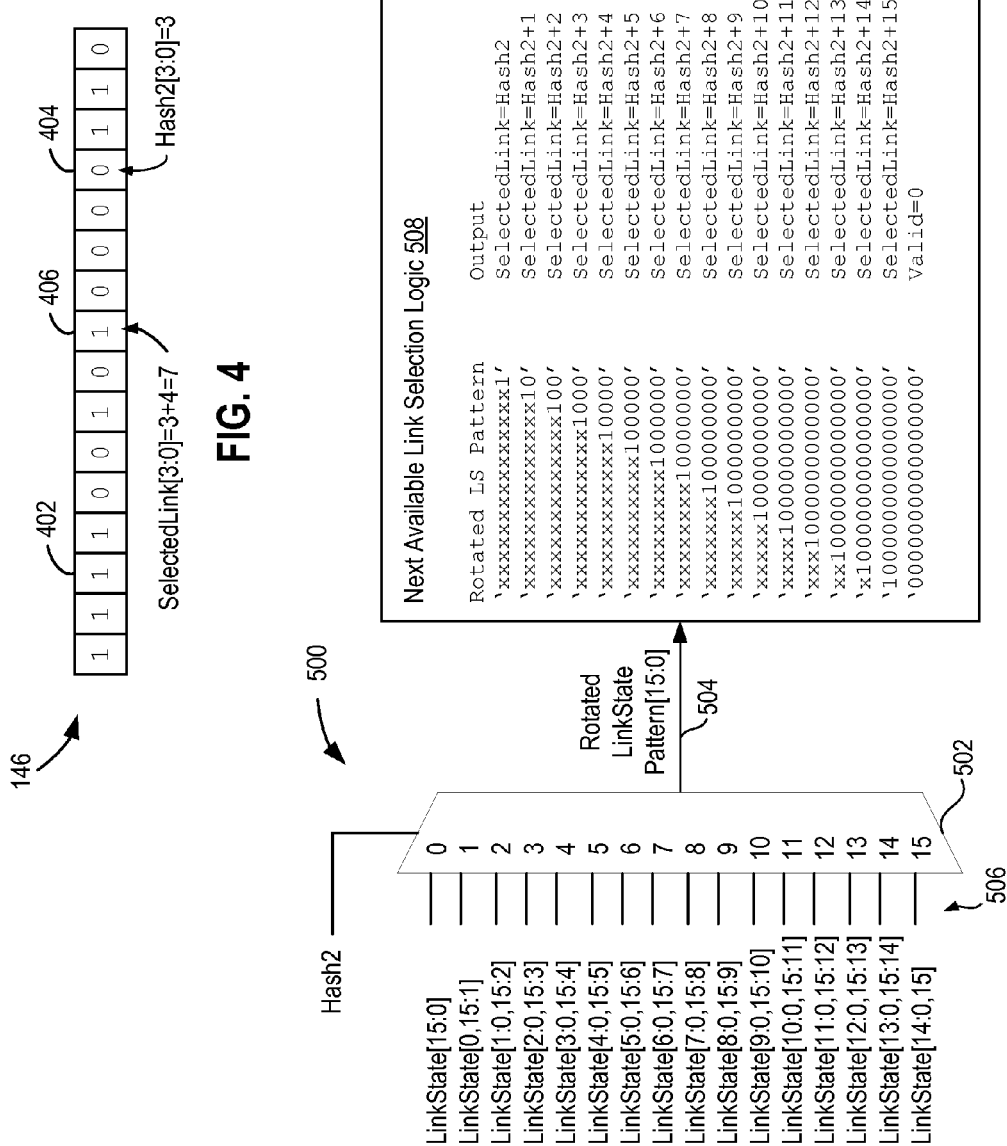

FLOW DISTRIBUTION ALGORITHM FOR AGGREGATED LINKS IN AN ETHERNET SWITCH

BACKGROUND

Embodiments of the invention generally relate to the field of computer networks.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

BRIEF SUMMARY

Embodiments of the invention provide a method, product, and system for performing an operation for forwarding a data frame through a distributed network switch. In one embodiment, the method includes generating a hash value based on routing information of the data frame and dividing the hash value into a plurality of chunks. The values of the plurality of chunks may correspond to a plurality of links associated with a link aggregation group. The method further includes determining a selected link having an up state from the plurality of links based on a hierarchical order of the plurality of chunks, and forwarding the data frame to the selected link.

BRIEF DESCRIPTION OF THE SEVERAL VIEWS OF THE DRAWINGS

FIG. 4 is a block diagram illustrating link state information for a distributed network switch, according to one embodiment of the invention.

FIG. 5 is a block diagram illustrating components for distributing packet flow across an aggregated link in a distributed network switch, according to one embodiment of the invention.

Figure 1:
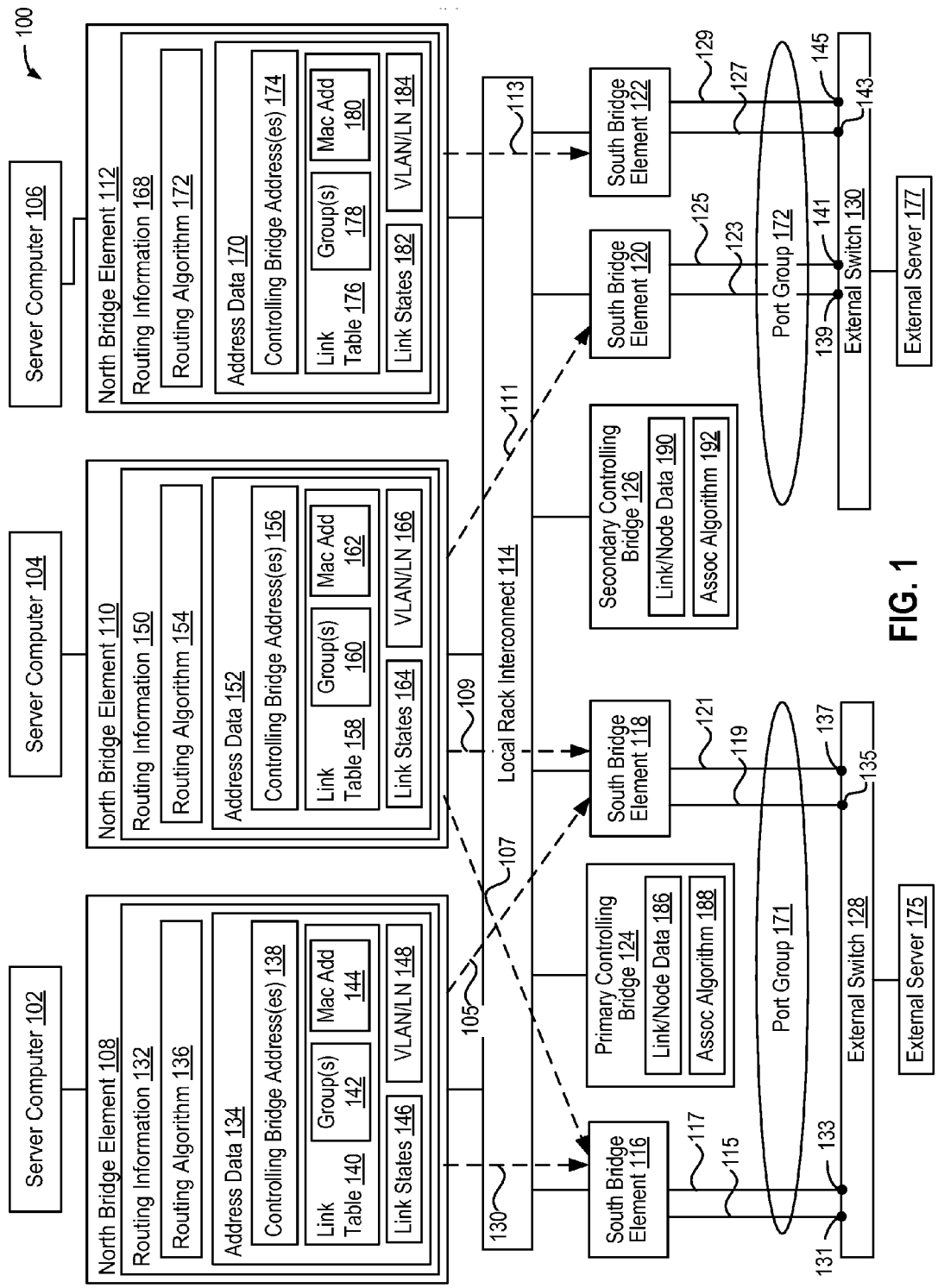
FIG. 1 is a block diagram of a system having a distributed network switch configured to route data frames in a distributed manner, according to one embodiment of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram of a computer system having a distributed network switch 100 configured to route data frames in a distributed manner, according to one embodiment of the invention. The system includes north bridge elements 108, 110, and 112 configured to route data frames in a distributed manner. In the embodiment shown, server computers 102, 104, and 106 are coupled to the north bridge elements 108, 110, and 112, respectively. In one embodiment, the north bridge elements 108, 110, and 112 may comprise part of a distributed network switch 100 configured to act as a virtual bridge that spans multiple server computers. The bridge elements may be configured to perform Layer-2 switching functions. The bridge elements may accomplish operational and frame-forwarding decisions in parallel by distributing load balancing determinations.

The north bridge element 108 may be coupled to a local rack interconnect 114. The other ingress (i.e., north) bridge elements 110, 112, may be additionally coupled to the local rack interconnect 114. The local rack interconnect 114 may be further coupled to south bridge elements 116, 118, 120, and 122. The local rack interconnect 114 is configured to facilitate point-to-point connections between the bridge elements 108, 110, 112, 116, 118, 120, and 122 without frame loss and with in-order frame delivery. The system further includes a primary controlling bridge 124 and a secondary controlling bridge 126 coupled to the local rack interconnect 114.

The south bridge element 116 may be coupled to an external switch 128, which is coupled to an external server 175. In the embodiment shown, a link 115 couples the south bridge element 116 to a port 131 of the external switch 128. The south bridge element 116 may be coupled to a port 133 of the external switch 128 via a link 117. As shown, the south bridge element 118 may be coupled to a port 135 of the external switch 128 via a link 119. A link 121 may connect the south bridge element 118 to a port 137 of the external switch 128. The south bridge element 120 may be coupled to an external switch 130 at ports 139 and 141 via links 123 and 125, respectively. The south bridge element 122 may be coupled to the external switch 130 at ports 143 and 145 via links 127 and 129, respectively. The external switch 130 may be coupled to an external server 177. In one embodiment, the ports 131, 133, 135, and 137 may be associated with a first port group 171. The ports 139, 141, 143, and 145 may be associated with a second port group 172.

The north bridge elements 108, 110, and 112 may include routing information 132, 150, 168 communicated by the primary controlling bridge 124. For sake of discussion, detailed components are described in reference to north bridge element 108, however it should be recognized that north bridge elements 110 and 112 are configured similarly. Routing information 132 may include address data 134 and a routing algorithm 136. The routing algorithm 136 may include instructions used to route data frames to be transmitted from the north bridge element 108. The address data 134 may be associated with the north bridge element 108 by the primary controlling bridge 124. The address data 134 may include controlling bridge addresses 138 and a link table 140. Illustrative controlling bridge addresses 138 may correspond to MAC addresses of the primary controlling bridge 124 and of the secondary controlling bridge 126. The link table 140 of the north bridge element 108 may include port group information 142 and MAC addresses 144. The port group information 142 may include information pertaining to the first port group 171 assigned or otherwise associated with the north bridge element 108. The MAC addresses 144 may include addresses of the south bridge elements 116, 118, 120, 122, among other components of the system.

In one embodiment, the address data 134 of the north bridge element 108 includes link state information 146 having status information pertaining to various links and ports that are associated with the north bridge element 108. The address data 134 may also include virtual local area networks (VLAN) and logical network (LN) assignments 148 associated with the north bridge element 108. For example, the VLAN and logical network assignments 148 may be used by the north bridge element 108 to route data frames. Through north bridge elements 108, VLANs and logical networks may be further associated with port groups 171, 172.

The primary controlling bridge 124 may include link and node data 186. The link and node data 186 may include MAC addresses of ports and/or links to be associated with the north bridge elements 108, 110, 112 for routing data frames. The primary controlling bridge 124 may also include at least one associating algorithm 188 configured to automatically assign the address data 134 and the routing algorithm 136 to the north bridge elements 108, 110, 112.

The secondary controlling bridge 126 may include link and node data 190, as well as an associating algorithm 192. As with the primary controlling bridge 124, the secondary controlling bridge 126 may be configured to provide one or more of the north bridge elements 108, 110, 112 with routing information 132, including address data 134 and routing information 132. The primary and secondary controlling bridges 124, 126 may exchange protocol messages with one or more of the north bridge elements 108, 110, 112 and may create and program one or more of the port groups 171, 172. For example, the primary controlling bridge 124 may create a first port group 171 and may exchange Link Aggregation Control Protocol (LACP) messages with the south bridge elements 116, 118, 120, 122. The primary controlling bridge 124 may further create the second port group 172. The port groups 171, 172 may be associated with bridge elements, VLANs, and/or logical networks, per the routing information. For example, the first port group 171 may be a primary port group for first and second VLANs, and a secondary, or backup, port group for a third VLAN.

In operation, the primary controlling bridge 124 may communicate the routing information 132 to the north bridge element 108. The north bridge element 108 may process and forward each received data frame directly to an appropriate external physical uplink port. For example, the north bridge element 108 may be configured to forward data frames to the south bridge element 116, as indicated by dashed line 130, and to the south bridge element 118, as indicated by dashed line 105. The north bridge element 110 may be configured to forward data frames to the south bridge element 116, as indicated by dashed line 107. The north bridge element 110 may further be configured to communicate data frames to the south bridge element 118 and the south bridge element 120, as indicated by dashed lines 109 and 111, respectively. The north bridge element 112 may be configured to forward data frames to the south bridge element 122, as indicated by dashed line 113. The north bridge element 108 may thus be configured to forward data frames to the same south bridge element 118 as the north bridge element 110.

The distributed network switch 100 may be configured to automatically facilitate failover operations. For example, the south bridge element 118 may detect a fault, or failure, associated with the link 119 to the external switch 128. The link failure may include a fault associated with the physical link 119 or the port 135. The south bridge element 118 may inform the primary controlling bridge 124 that the link 119 is faulty. The link 119 is associated with the port group 171. The primary controlling bridge 124 may communicate updated link state information to the north bridge elements 108 and 110 that use sub-links in the affected first port group 171 that indicate the failure of the link 119. The south bridge element 118 may optionally notify the north bridge element 108 that its forwarding attempt was unsuccessful. The north bridge elements 108 and 110 may refrain from using the link 119 during subsequent link selection, according to techniques described further below.

Figure 2:
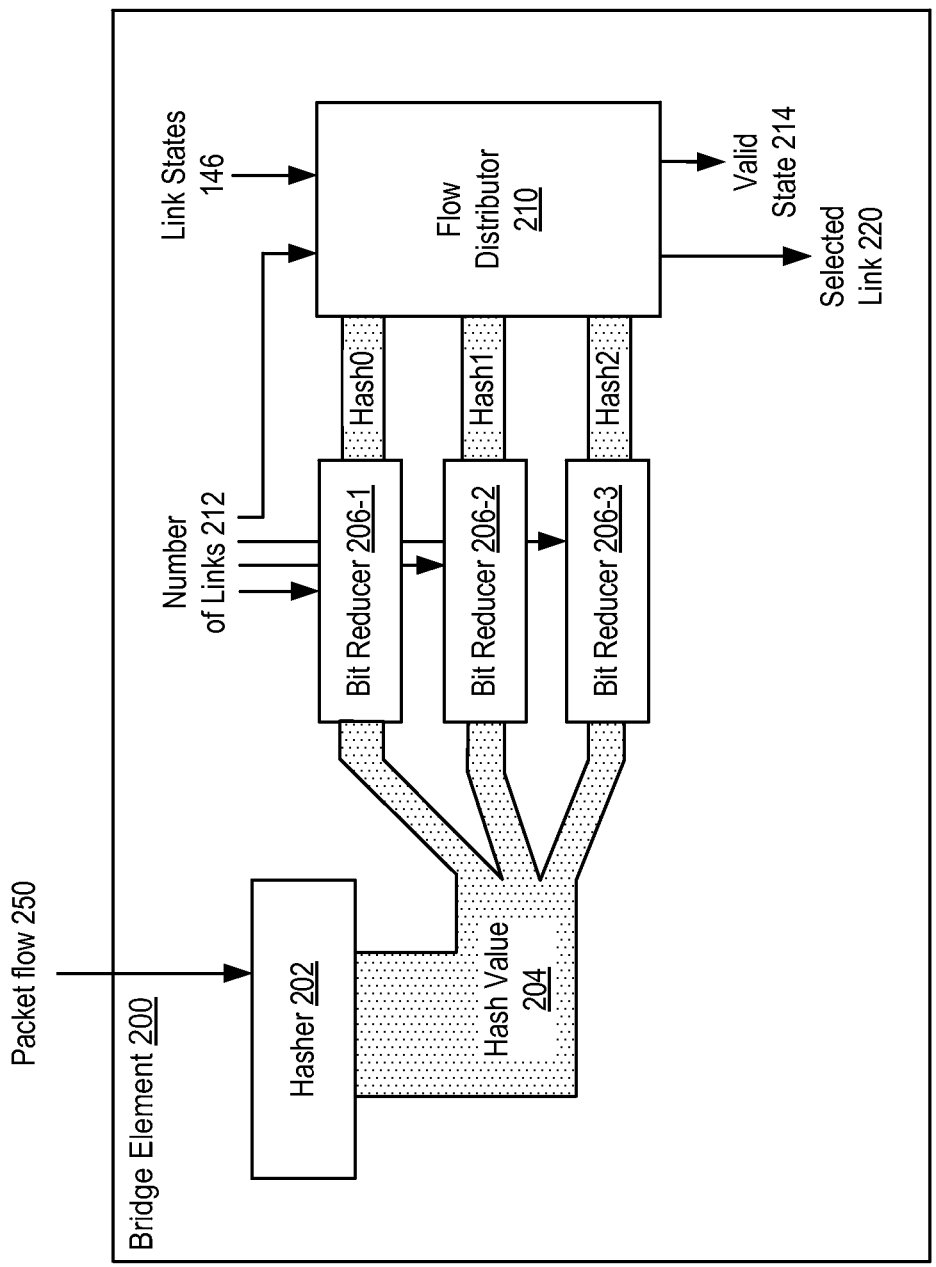
FIG. 2 is a block diagram illustrating a bridge element configured to select a link for distributing packet flow, according to one embodiment of the invention.

FIG. 2 is a block diagram illustrating a bridge element 200 in greater detail, according to one embodiment of the present invention. In one embodiment, a bridge element 200 is configured to receive packet flow 250 and distribute the ingress packet flow 250 to a selected one of a plurality of sub-links in a port group. In some embodiments, the bridge element 200 can be the bridge elements 108, 110, 112, 116, 118, 120, 122 of FIG. 1.

In one embodiment, the bridge element 200 includes a hasher 202 configured to generate a hash value 204 corresponding to the packet flow 250 using one or more data fields of the packet flow 250. In some embodiments, the hasher 202 may be configured to use one or more fields from headers of the packet flow 250, including Layer 2 header fields (e.g., destination MAC address, source MAC address, EtherType protocol identifier, VLAN tag), IPv4 or IPv6 header fields (e.g., destination IP address, source IP address), and Fibre Channel over Ethernet (FCoE) header fields. In some embodiments, the hasher 202 may be a fully programmable XOR matrix that may be programmed to select particular header fields from the ingress packet flow for generating a hash value.

In one embodiment, the bridge element 200 is configured to subdivide the hash value 204 into a plurality of portions, or chunks, to be used in a hierarchical fashion to select the link to use for this packet. In the example shown, the hasher 202 generates a 12-bit hash value that is subdivided into three 4-bit hash value chunks (identified as Hash0, Hash1, and Hash2), with a first value comprised of bits 0-3 from the 12-bit hash value, a second value comprised of bits 4-7, and a third value comprised of bits 8-11. For sake of illustration, the bridge element 200 is configured to forward data flow to at least 16 different sub-links, such that each 4-bit value split from the hash value 204 has enough bits to specify any of the 16 sub-links. However, it should be recognized that the techniques described herein may be extended to be used with any number of sub-links, particularly a number of sub-links that is not a power of 2, and with different hash values and sub-divided values derived from the hash value.

In one embodiment, the bridge element 200 is configured to perform a bit reduction operation on each of the hash value chunks that modifies the hash value chunk to be within the range of the number of sub-links selectable by the bridge element 200. In the embodiment shown, the chunks of the hash value 204 are provided to a plurality of bit reducers 206-1, 206-2, 206-3 configured to perform bit reduction operations such that the 4-bit values of Hash0, Hash1, and Hash2 are within the range of the number of sub-links, in cases where the number of sub-links is a power of 2 (e.g., 2, 4, 8, 16). In cases where there are a non-power of 2 number of sub-links, the 4-bit values of Hash0, Hash1, and Hash2 may still exceed the number of sub-links after the bit reduction operations and may be handled by further processing, as described later. The bit reduction operation for the 4-bit example is shown in greater detail in Table 1 below.

TABLE 1

Bit Reduction Operation for 4-Bit Example

| NbLink | NbHashBits | HashN |
|---|---|---|
| 1 | 0 | [3:0] = 0b0000 |
| 2 | 1 | [3:1] = 0b000 |
| 3, 4 | 2 | [3:2] = 0b00 |
| 5, 6, 7, 8 | 3 | [3] = 0b0 |

In Table 1, the column labeled NbLink refers to the number of sub-links selectable by the bridge element 200. The column labeled NbHashBits refers to a desired number of significant bits in the hash value (e.g., 0 to 3 bits) depending on the number of sub-links (e.g., 1 to 8 sub links). The column labeled HashN illustrates how the chunk of the hash value 204 is modified. The bit reduction operation modifies an input value (e.g., a divided portion of the hash value 204) by masking the most significant bits (e.g., Hash0). For instance, in cases where there are four sub-links (e.g., NbLink is 4), Table 1 indicates that 2 hash bits (e.g., NbHashBits is 2) are sufficient to refer to any of sub-links. As such, the bit reduction operation modifies Hash0 to have two significant bits by zeroing out all but two of the least significant bits (e.g., [3:2]=0b00).

In one embodiment, each of the values Hash0, Hash1, and Hash2 are provided to a flow distributor 210 configured to select a sub-link to which to distribute the ingress packet flow 250. The flow distributor 210 may be configured to select a sub-link and generate an output representing a selected link 220 based on the plurality of hash value chunks (e.g., Hash0, Hash1, Hash2), a number of sub-links 212 selectable by the bridge element 200, and link state information 146, described above. In some embodiments, the flow distributor 210 may be configured to indicate a valid state 214 based on the link selection procedure described later. In one embodiment, the flow distributor 210 uses the plurality of hash value chunks which advantageously increases the probability of getting a result that points to a link that is configured and is "up". The operations of the flow distributor 210 are shown in greater detail in FIG. 3.

Figure 3:
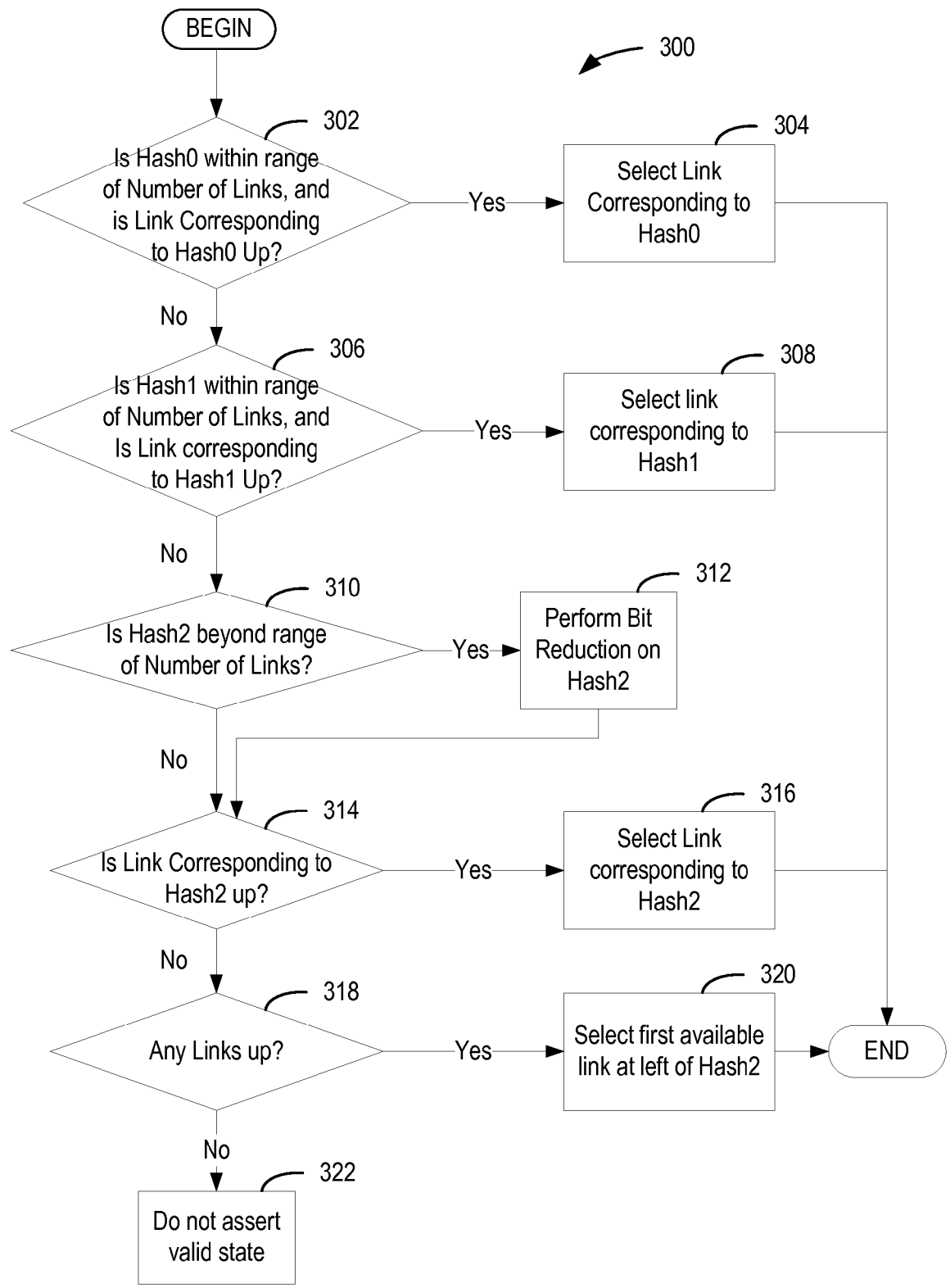
FIG. 3 is a flowchart depicting a method for distributing packet flow across an aggregated link in a distributed network switch, according to one embodiment of the invention.

FIG. 3 is a flowchart depicting a method 300 for distributing packet flow across an aggregated link in a distributed network switch, according to one embodiment of the invention. The method 300 determines in a hierarchical manner whether any of the hash value chunks (e.g., Hash0, Hash1, Hash2) corresponds to a sub-link in the link aggregation group that has an "up" state and is available for forwarding the packet flow to the end point. In some embodiments, the bridge element determines a first link having an up state from the plurality of links based on a hierarchical order of the hash value chunks.

As shown, the method 300 begins at step 302, where a bridge element (e.g., bridge element 200) determines whether the value of a first hash value chunk (e.g., Hash0) is within range of the number of sub-links (e.g., Hash0<NbLink), and whether the link corresponding to the first hash value chunk is "up" as indicated by link state information 146 (e.g., LinkState[Hash0]==1). If so, at step 304, the bridge element selects the link corresponding to the first hash value chunk (e.g., Hash0). It should be recognized that even though operations of bit reducer 206-1 on Hash0 may reduce its number of significant bits, the value of Hash0 may still exceed the number of sub-links, particularly in cases where the number of sub-links is not a power of 2. For example, if Hash0 had a 4-bit value of 0b1111, a bit reduction operation based on five sub-links would modify Hash0 (e.g., [3]=0b0) to become 0b0111 or 7, which still exceeds the number of sub-links 5. As such, if the bridge element determines the value of Hash0 is not within range of the number of sub-links, or if the link corresponding to the first value Hash0 is down according to link state information 146, operations proceed to step 306.

At step 306, the bridge element determines whether the value of a second hash value chunk (e.g., Hash1) is within range of the number of sub-links (e.g., Hash1<NbLink), and whether the link corresponding to Hash1 is "up" as indicated by the link state information 146 (e.g., LinkState[Hash1]==1). If so, at step 308, the bridge element selects the link corresponding to the second hash value chunk Hash1. Otherwise, the bridge element determines the value of Hash1 is not within range of the number of sub-links, or if the link corresponding to the second value Hash1 is down according to link state information 146, and proceeds to step 310.

At step 310, the bridge element determines whether a third hash value chunk (e.g., Hash2) is beyond the range of the number of links. If so, at step 312, the bridge element performs a subsequent bit reduction procedure that ensures the value of Hash2 is within the range of the number of links, and proceeds to step 314. An example subsequent bit reduction procedure is shown in pseudo-code in Table 2 below.

TABLE 2

Example Subsequent Bit Reduction Operation

| 1 | if Hash2[2:0] < NbLink then Hash2[3]=0; |
| 2 | else if Hash2[1:0] < NbLink then Hash2[3:2]=0; |
| 3 | else Hash2[3:1]=0 |
| 4 | assert Hash2 < NbLink |

As shown in line 1 of Table 2, if the 3 least significant bits of the Hash2 value (e.g., Hash2[2:0]) are within the range of the number of sub-links, the operation masks the most significant bit (e.g., Hash2[3]) and keeps the other three bits. Otherwise, at line 2, if the 2 least significant bits of the Hash2 value (e.g., Hash2[1:0]) are within the range of the number of sub-links, the operation masks the 2 most significant bits (e.g., Hash2[3:2]) and keeps the other 2 bits. Otherwise, at line 3, the operation masks the 3 most significant bits (e.g., Hash2[3:1]) thereby keeping 1 bit. In some embodiments, at line 4, the operations may check (e.g., via assertion) to ensure the value of Hash2 is within the range of the number of links.

Referring back to FIG. 3, at step 314, responsive to determining that the Hash2 is within range of the number of links (or after modifying Hash2 to ensure such, as in step 312), the bridge element determines whether the link corresponding to Hash2 is up based on link state information 146. If so, at step 316, the bridge element selects the link corresponding to the third value Hash2. Otherwise, at step 318, the bridge element determines whether any links are up based on link state information 146. If no links are up, at step 322, the bridge element does not assert a valid state for link selection. In some embodiments, the bridge element may raise an error or notify a higher-level process that no links are currently up.

At step 320, responsive to determining that at least some links are up, the bridge element selects a next available sub-link based on the third value Hash2. In some embodiments where the link states of the sub-links are represented in a bit map, the bridge element may select a first available sub-link "at the left of" the down sub-link corresponding to the value of Hash2. In the example of FIG. 4, link state information 146 is depicted as a 16-bit bit map wherein each of the bits 402 correspond to a sub-link selectable by a bridge element, and non-zero and zero values represent "up" and "down" states of the corresponding sub-links. In the example shown, a bit 404 indexed by the value of Hash2 (e.g., 3) contains a zero value indicating the corresponding sub-link (e.g., sub-link 3) is down. According to one embodiment, the bridge element selects a sub-link corresponding to bit 406 which is the next available sub-link to the left of the bit 404. As shown in FIG. 4, the bridge element selects sub-link 7 that corresponds to the selected bit 406.

FIG. 5 is a block diagram illustrating a system 500 for selecting a sub-link for distributing packet flow across an aggregated link in a distributed network switch, according to one embodiment of the invention. In one embodiment, the system 500 includes a multiplexor 502 configured to output a rotated link state pattern 504 representing the link state information 146 according to a hash value chunk (e.g., Hash2). In some embodiments, the multiplexor 502 receives a plurality of permutations 506 that include the link state information 146 in various rotations (e.g., LinkState[15:0], LinkState[4:0,15:5], etc.).

In one embodiment, the multiplexor 502 is configured provide one of the permutations 506 as the rotated link state pattern 504 based on the hash value chunk. The hash value chunk provides a starting point for determining which of the plurality of sub-links is up and may be selected for flow distribution. The link state information is rotated based on the hash value chunk to normalize the format of the link state information prior to iteratively determining whether a next sub-link is up and available for selection. In some embodiments, the link state information is rotated such that the sub-link corresponding to the hash value chunk (e.g., Hash2) is positioned at the least significant bit. For example, if the value of Hash2 was 3, then the rotated link state pattern 504 is generated where link state information is rotated 3 places (e.g., LinkState[2:0, 15:3]), such that the link corresponding to Hash2 (e.g., the fourth sub-link) is at the least significant bit.

The system further includes next-available-link selection logic 508 configured to select a sub-link (e.g., selected link 220) based on the rotated link state pattern 504 provided by the multiplexor 502. By using the rotated link state pattern 504 to normalize the position of the first candidate sub-link (e.g., link corresponding to Hash2), embodiments of the present invention advantageously allow faster execution and re-use of conditional logic for the next-available-link selection logic 508. In one embodiment, the next-available-link selection logic 508 includes logic that scans through a plurality of candidate patterns having the least significant bits starting with a non-zero value (e.g., 1) and optionally ending with one or more Os, and determines whether the rotated link state pattern 504 matches any of the candidate patterns. If so, the next-available-link selection logic 508 outputs the associated output, such as a selected link 220 or valid state 214, as shown in FIG. 5.

Unlike conventional implementations of a hash method for flow distribution that work poorly with non-power-of-2 number of links, embodiments of the present invention advantageously provide for equitable traffic distribution for link aggregation groups with any number of links, including link aggregation groups having a non-powers-of-2 number of links. For example, under a conventional hashing technique to select between 5 links (numbered 0, 1, 2, 3, 4), 3 hash result bits would be used to point to which link to use. However, when the hash result is 5, 6, or 7, this traffic would have to be directed to links 0, 1, 2, 3, or 4 instead. If a remainder operation (e.g., modulo 4) were used, this would result in an unequal flow distribution across links that may be undesirable. As such, embodiments of the present invention provide equitable traffic distribution for link aggregation groups that works well for non-power-of-2 numbers of links. Further, embodiments of the present invention maintain equitable traffic redistribution when links go down and come back up.

Embodiments of the present invention provide a technique for flow distribution such that if all defined links are "up," flows may be spread evenly across them. In some embodiments, as long as all defined links are up, a given flow F may use the same link, sometimes referred to as a "primary link." In some embodiments, if a given link goes down, the flow set F targeting the down link may be spread across other available links. In some embodiments, other flows associated with still-operational links may not be re-balanced and may remain on their assigned primary link. In some embodiments, when a link goes down, packets may be lost due to the latency from the time the link goes down to the time that the link state is updated across the distributed network fabric. In some embodiments, upper level protocols (such as Layer 3, Network layer, or IP layer) may be responsible for the detection of these lost packets and the retry of these lost packets.

According to one embodiment, if after a time delay, the primary link returns to an "up" state, the flow distribution algorithm described herein may become aware of this change in state and automatically switch the re-distributed flows back to their original primary links. It has been determined that, in such a case, there may be packet misordering within a given flow. In some embodiments, this automatic re-distribution may be controlled (e.g., enabled or disabled) by a configuration parameter and interrupt mechanism that allows firmware to take action as desire. For example, when a link comes back up, the distributed network fabric may be configured to still assume a link is down until otherwise notified by higher-level process (e.g., software).

According to one embodiment, the flow distribution technique described herein may be used even though a plurality of sub-links may be down. In some embodiments, the bridge element is configured to perform the above-described flow distribution operation so long as a threshold number of links have an "up" state. In some embodiments, the threshold number of links may be configured as at least half of links selectable by the bridge element for packet flow. In some embodiments, responsive to determining that the number of down link has exceeded a threshold value, the bridge element may be configured to notify higher-level processes (e.g., software). In some embodiments, software may be responsible for updating the configuration to switch to a new set of links (e.g., a backup set of links), or change the configuration of this aggregated link set (e.g., changing the link aggregation group).

While the foregoing is directed to embodiments of the present invention, other and further embodiments of the invention may be devised without departing from the basic scope thereof, and the scope thereof is determined by the claims that follow.

What is claimed is:

1. A computer-readable storage medium having computer-readable program code embodied therewith, the computer-readable program code comprising:
    computer-readable program code configured to generate a hash value based on routing information of a data frame;
    computer-readable program code configured to split the hash value into a plurality of chunks, wherein values of the plurality of chunks correspond to a plurality of links associated with a link aggregation group;
    computer-readable program code configured to modify each of the plurality of chunks based on a number of the plurality of links;

computer-readable program code configured to determine a selected link having an up state from the plurality of links based on a hierarchical order of the plurality of chunks; and computer-readable program code configured to forward the data frame to the selected link.

2. The computer-readable storage medium of claim 1, wherein the computer-readable program code configured to modify a chunk further comprises computer-readable program code configured to reduce a most significant bit of the chunk based on the number of the plurality of links.

3. The computer-readable storage medium of claim 1, wherein the computer-readable program code configured to determine the selected link having an up state based on the hierarchical order of the plurality of chunks further comprises:

computer-readable program code configured to, responsive to determining a first chunk of the plurality of chunks is within range of a number of the plurality of links and the first chunk corresponds to a first link having an up state, select the first link.

4. The computer-readable storage medium of claim 3, further comprising:

computer-readable program code configured to, responsive to determining the first chunk of the plurality of chunks is not within range of a number of the plurality of links or the first chunk does not correspond to a link having an up state, determine a second chunk of the plurality of chunks is within range of the number of the plurality of links and the second chunk corresponds to a second link having an up state; and computer-readable program code configured to select the second link.

5. The computer-readable storage medium of claim 3, further comprising:

computer-readable program code configured to determine the first chunk of the plurality of chunks is not within range of a number of the plurality of links or the first chunk does not correspond to a link having an up state;

computer-readable program code configured to modify a second chunk of the plurality of chunks to be within range of the number of the plurality of links; and computer-readable program code configured to, responsive to determining the second chunk corresponds to a second link having an up state, select the second link.

6. The computer-readable storage medium of claim 1, wherein the computer-readable program code configured to determine the selected link having an up state based on the hierarchical order of the plurality of chunks further comprises:

computer-readable program code configured to, responsive to determining none of the plurality of chunks are within range of a number of the plurality of links and are corresponding to a link having an up state, select a first available link relative to a down link corresponding to a first chunk of the plurality of chunks.

7. The computer-readable storage medium of claim 6, wherein the computer-readable program code configured to select the first available link further comprises:

computer-readable program code configured to generate a rotated link state pattern based on link state information of the plurality of links and based on the first chunk; and computer-readable program code configured to select the first available link based on the generated rotated link state pattern.

8. A system for forwarding a data frame through a distributed network switch, comprising:

one or more computer processors; and a memory containing a program which, when executed by the one or more computer processors, is configured to perform an operation comprising:

generating, by operation of the one or more computer processors, a hash value based on routing information of a data frame;

splitting the hash value into a plurality of chunks, wherein values of the plurality of chunks correspond to a plurality of links associated with a link aggregation group;

modifying each of the plurality of chunks based on a number of the plurality of links;

determining a selected link having an up state from the plurality of links based on a hierarchical order of the plurality of chunks; and forwarding the data frame to the selected link.

9. The system of claim 8, wherein the modifying a chunk further comprises reducing a most significant bit of the chunk based on the number of the plurality of links.

10. The system of claim 8, wherein the determining the selected link having an up state based on the hierarchical order of the plurality of chunks further comprises:

responsive to determining a first chunk of the plurality of chunks is within range of a number of the plurality of links and the first chunk corresponds to a first link having an up state, selecting the first link.

11. The system of claim 10, wherein the operation further comprises:

responsive to determining the first chunk of the plurality of chunks is not within range of a number of the plurality of links or the first chunk does not correspond to a link having an up state, determining a second chunk of the plurality of chunks is within range of the number of the plurality of links and the second chunk corresponds to a second link having an up state; and selecting the second link.

12. The system of claim 10, wherein the operation further comprises:

determining the first chunk of the plurality of chunks is not within range of a number of the plurality of links or the first chunk does not correspond to a link having an up state;

modifying a second chunk of the plurality of chunks to be within range of the number of the plurality of links; and responsive to determining the second chunk corresponds to a second link having an up state, selecting the second link.

13. The system of claim 8, wherein the determining the selected link having an up state based on the hierarchical order of the plurality of chunks further comprises:

responsive to determining none of the plurality of chunks are within range of a number of the plurality of links and are corresponding to a link having an up state, selecting a first available link relative to a down link corresponding to a first chunk of the plurality of chunks.

14. The system of claim 13, wherein the selecting the first available link further comprises:
   generating a rotated link state pattern based on link state information of the plurality of links and based on the first chunk; and
   selecting the first available link based on the generated rotated link state pattern.

\* \* \* \* \*